United States Patent [19]
Shibata

[11] Patent Number: 5,682,794
[45] Date of Patent: Nov. 4, 1997

[54] BICYCLE SHIFTING CONTROL UNIT

[75] Inventor: Toshio Shibata, Sakai, Japan

[73] Assignee: Shimano, Inc., Osaka, Japan

[21] Appl. No.: 660,670

[22] Filed: Jun. 5, 1996

[51] Int. Cl.[6] .......................... B62M 25/04; B62K 23/06
[52] U.S. Cl. ................... 74/489; 74/142; 74/475; 74/502.2
[58] Field of Search ..................... 74/142, 475, 489, 74/502.2

[56] References Cited

U.S. PATENT DOCUMENTS

| 5,012,692 | 5/1991 | Nagano | 74/142 X |
| 5,044,213 | 9/1991 | Nagano | 74/142 |
| 5,203,213 | 4/1993 | Nagano | 74/142 X |
| 5,617,761 | 4/1997 | Kawakami | 74/142 X |

Primary Examiner—Allan D. Herrmann
Attorney, Agent, or Firm—James A. Deland

[57] ABSTRACT

A bicycle shifting control unit includes a control member operable by a user, and a rotating body for rotating in one direction to wind a shifting cable and for rotating in another direction to unwind the shifting cable. A first transmission transmits movement of the control member into rotation of the rotating body at a first transmission ratio, and a second transmission transmits movement of the control member into rotation of the rotating body at a second transmission ratio. The second transmission ratio is greater than the first transmission ratio. A coupling mechanism is provided for allowing the control member to be selectively coupled to the first and second transmissions.

20 Claims, 5 Drawing Sheets

BICYCLE SHIFTING CONTROL UNIT

BACKGROUND OF THE INVENTION

The present invention is directed to a bicycle shifting control unit and, more particularly, to a bicycle shift control unit which communicates movement of a control lever to a cable winding member through a variable transmission.

Japanese Utility Model 7-40390 discloses a shift control lever wherein the user may shift one gear at a time or multiple gears at a time with a single operation of the shift lever. However, when shifting multiple gears at a time, the lever must swing a large distance which makes such shifting difficult while keeping a firm grasp on the handlebars. If the shift control unit is adjusted to lessen the distance the lever must travel to shift the multiple gears, then the distance the lever travels when shifting one gear at a time becomes too small for ergonomic operation. Thus, a lever typically can be set to conveniently shift one gear at a time or multiple gears at a time, but not both.

SUMMARY OF THE INVENTION

The present invention is directed to a bicycle shift control lever wherein the lever may be used for shifting one gear at a time and multiple gears at a time with a comfortable range of motion of the shift lever. In one embodiment of the present invention, a bicycle shifting control unit includes a control member operable by a user, and a rotating body for rotating in one direction to wind a shifting cable and for rotating in another direction to unwind the shifting cable. A first transmission transmits movement of the control member into rotation of the rotating body at a first transmission ratio, and a second transmission transmits movement of the control member into rotation of the rotating body at a second transmission ratio. The second transmission ratio is greater than the first transmission ratio. A coupling mechanism is provided for allowing the control member to be selectively coupled to the first transmission and to the second transmission.

In a more specific embodiment, the first transmission comprises a first transmission gear, and the second transmission comprises a second transmission gear. A first slave gear is coupled to the rotating body for meshing with the first transmission gear, and a second slave gear is coupled to the rotating body for meshing with the second transmission gear. A control gear is disposed on an end of the control member for selectively meshing with the first transmission gear and the second transmission gear.

In another embodiment, a first pawl is disposed on an end of the control member for selectively transmitting motion to the first and second transmissions when the control member is moved in a first direction along a drive path, and a second pawl is disposed on an end of the control member for selectively transmitting motion to the first and second transmissions when the control member is moved in a second direction along the drive path. If desired, a first cam may be provided for retaining the first pawl out of contact with the first and second transmissions when the control member moves in the second direction, and a second cam may be provided for retaining the second pawl out of contact with the first and second transmissions when the control member moves in the first direction. The cams may be structured so that the first and second pawls are retained out of contact with the first and second transmissions when the control member is disposed at an intermediate location along the drive path.

DETAILED DESCRIPTION OF THE EMBODIMENTS

Figure 1:
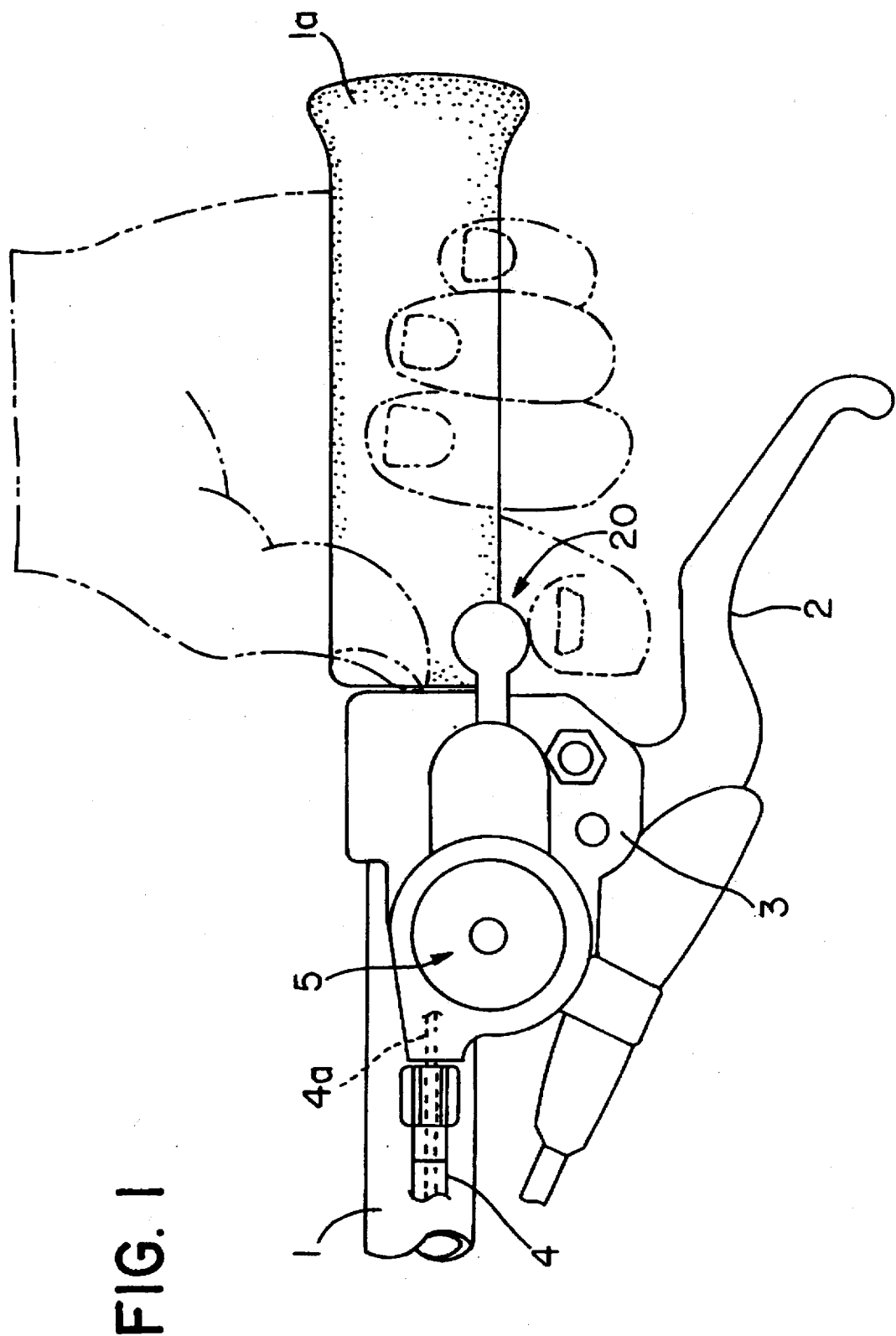
FIG. 1 is a perspective view of a particular embodiment of a bicycle shifting control unit according to the present invention.

FIG. 1 is a perspective view of a particular embodiment of a bicycle shifting control unit according to the present invention. As shown in FIG. 1, a brake bracket 3 which swingably supports a brake lever 2 is fixed adjacent to a grip 1a that is molded to the handlebars 1 of the bicycle, and a shifting control unit 5 for tightening and loosening an inner cable 4a of the shifting cable 4 is attached to brake bracket 3. In this embodiment, the control body 20 of the shifting control unit 5 can be operated by the thumb and forefinger of the hand holding onto the grip 1a.

Figure 2:
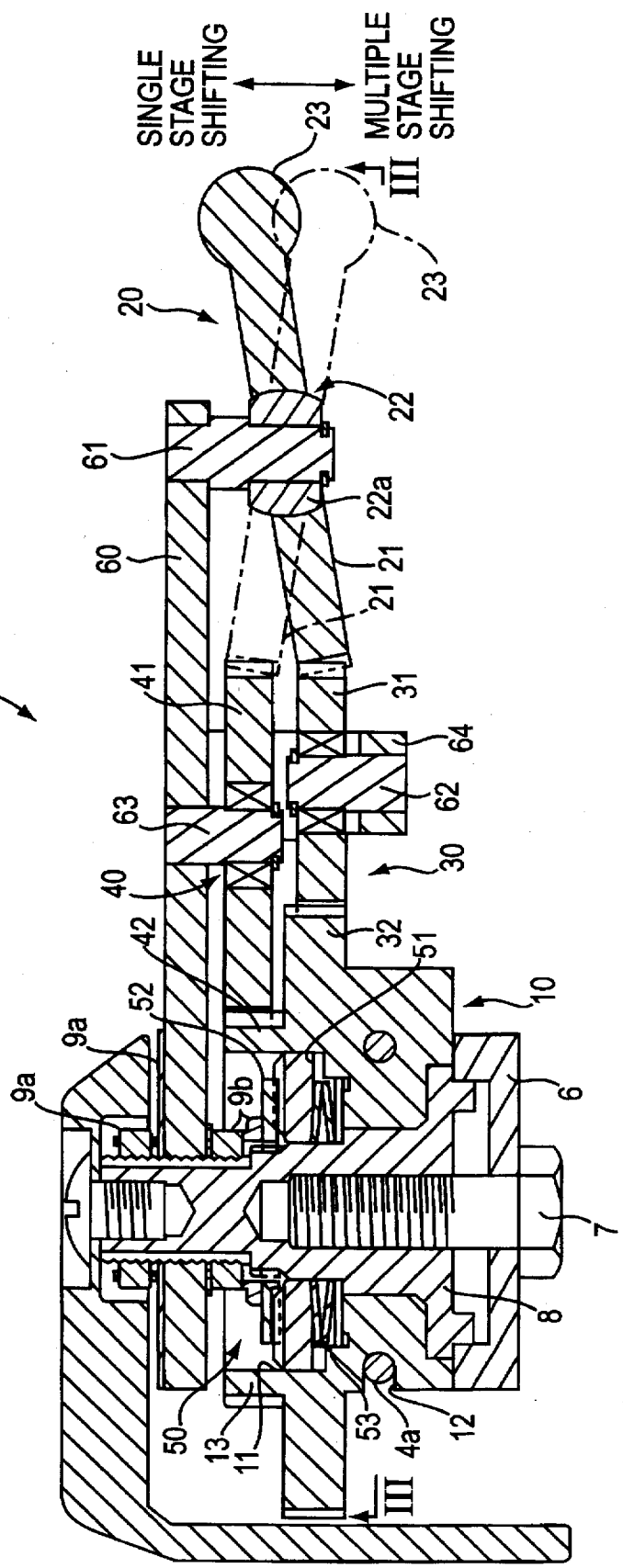
FIG. 2 is a cross-sectional view of the shifting control unit shown in FIG. 1.
Figure 3:
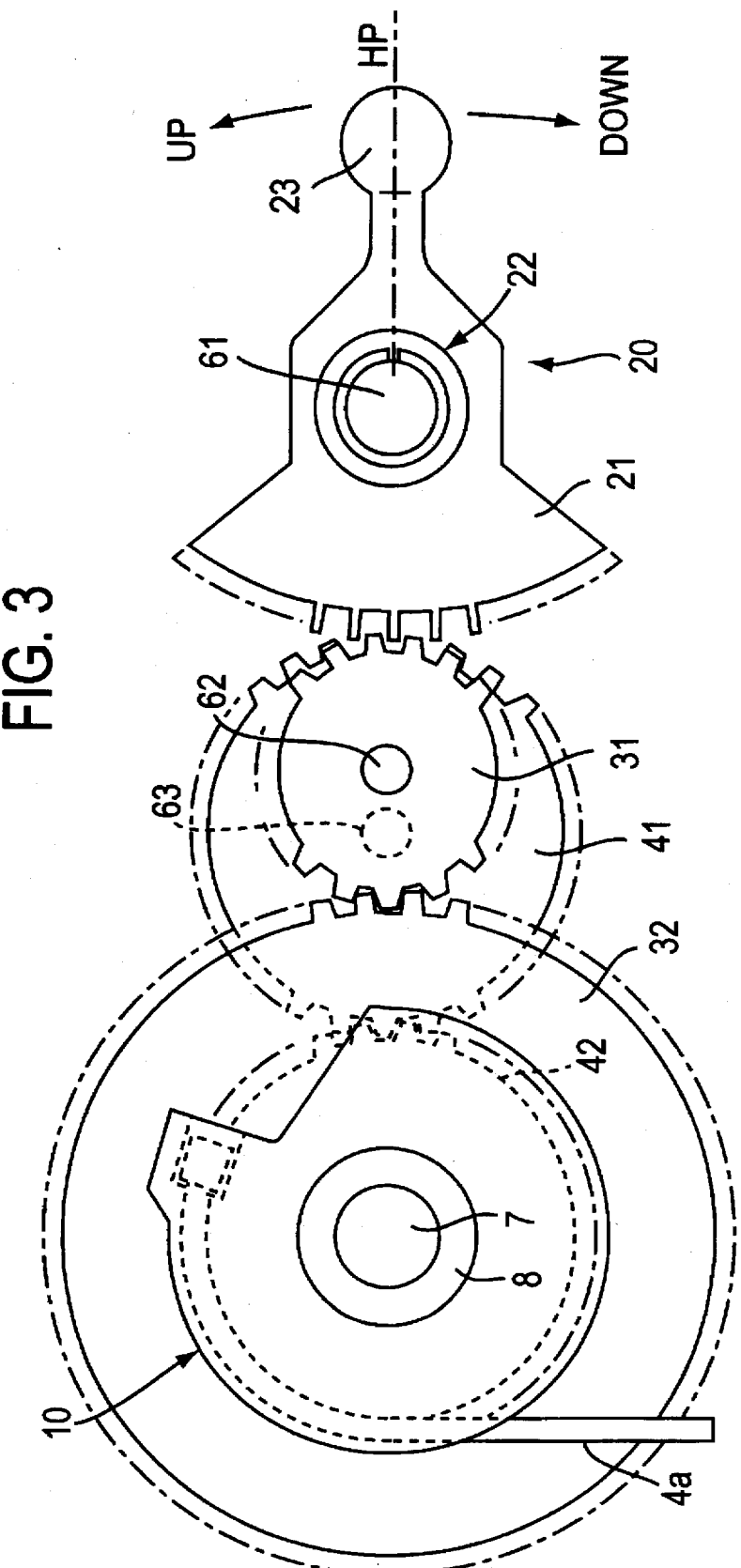
FIG. 3 is a cross-sectional view of the shifting control unit taken along line III—III of FIG. 2.

As shown in FIGS. 2 and 3, the shifting control unit 5 comprises a fixed axle 8 that is rotatably fixed by a bolt to a bracket 6 that is integrally molded with a brake bracket 3; a rotating body 10 that is attached to the base of this fixed axle 8; a position fixing mechanism 50 that fits into an indentation 11 molded in this rotating body 10; a first gear transmission mechanism 30 that serves as a first transmission means for transmitting the displacement of the control body 20 to the rotating body 10 to rotate it; and a second gear transmission mechanism 40 that serves as a second transmission means for transmitting the displacement of the control body 20, at a transmission ratio greater than that of the first gear transmission mechanism 30, i.e., by increasing the displacement of the control body 20 beyond that of the first gear transmission mechanism 30, to the rotating body 10 to rotate it.

As is made clear by FIGS. 2 and 3, the control body 20 is swingably attached via a support axle 61 to a holding plate 60 fixed by a first spacer/fixture set 9a and a second spacer/fixture set 9b to a specified position of the fixed axle 8. The control body 20 is composed of a fan-shaped gear 21 that is molded to one end of the control body, a knob part 23 suitably shaped for finger control that is molded to the other end of the control body, and a boss part 22 that is provided in the area between the gear 21 and the knob 23. The boss part 22 is furnished with a ball joint 22a, the inner race of this ball joint 22a is fixed to the support axle 61, and the gear 21 can swing freely in the axial direction and the peripheral direction of the support axle 61 depending on the operation of the knob 23.

As is clear from FIG. 2 in particular, swinging the control body 20 in the first direction that is parallel to the axial direction of the support axle 61 allows the gear 21 to engage either the drive gear 31 of the gear transmission mechanism 30 or the drive gear 41 of the gear transmission mechanism 40, which are described in detail below. When the control body 20 is swung in the second direction that is parallel to the peripheral direction of the support axle 61 while the gear 21 is engaged with the selected drive gear, the control displacement of the control body 20 is transmitted to the rotating body 10 via the selected gear transmission mechanism 30 or 40, and the rotating body 10 rotates in either the winding or unwinding direction depending on the direction in which the control body 20 is swung in the second direction. As described in detail below, a control displacement transmission suitable for single stage shifting is realized when the gear 21 is engaged with the drive gear 31 of the gear transmission mechanism 30, and a control displacement transmission suitable for multistage shifting is realized when the gear 21 is engaged with the drive gear 41 of the gear transmission mechanism 40. The control body 20 is energized by a spring, not shown in the figures, to the position at which the gear 21 engages the drive gear 31 of the gear transmission mechanism 30, and is ordinarily held at this single stage shifting position.

The first gear transmission mechanism 30 that serves as the first transmission means is furnished with a drive gear 31 that is rotatably attached to a support axle 62 fixed to an auxiliary bracket 64 extending from the support plate 60, and with a slave gear 32 that is provided to the outer periphery of the rotating body 10 so that it will engage the drive gear 31. The second gear transmission mechanism 40 that serves as the second transmission means is furnished with a drive gear 41 that is rotatably attached to a support axle 63 fixed to the support plate 60, and with a slave gear 42 that is provided to the outer periphery of the rotating body 10 so that it will engage the drive gear 41.

With this embodiment, the gear ratio of the drive gear 31 and the slave gear 32 of the first gear transmission mechanism 30 is 1/3, and the gear ratio of the drive gear 41 and the slave gear 42 of the second gear transmission mechanism 40 is 1/1. The gear 21 of the control body, moreover, is fan-shaped, but when calculated as a circular gear, the gear ratio of this gear to the drive gear 31 of the first gear transmission mechanism 30 is 3/1, and the gear ratio of this gear to the drive gear 41 of the second gear transmission mechanism 40 is 2/1.

With such a structure, when the control body 20 is swung only 10 degrees in terms of the angle of rotation in the second direction in a state in which the first gear transmission mechanism 30 has been selected, the result is that the rotating body rotates 10 degrees in terms of the angle of rotation. By contrast, when the control body 20 is swung by only 10 degrees in terms of the angle of rotation in the second direction in a state in which the second gear transmission mechanism 40 has been selected, the result is that the rotating body 10 rotates 20 degrees in terms of the angle of rotation. In short, when the second gear transmission mechanism 40 is selected, it is possible to obtain a rotational displacement of the rotating body 10 that is twice the displacement obtained when the first gear transmission mechanism 30 is selected, at the same control displacement angle. For this reason, the second gear transmission mechanism 40 should be selected for multistage shifting, and the first gear transmission mechanism 30 should be selected for single stage shifting. The transmission ratio between these transmission mechanisms can be set freely, within, of course, certain structural limitations.

The rotating body 10 is furnished with a drum that is structured so that the inner wire 4a of the shifting cable 4 is wound along the cable groove 12 from the front or rear shifting unit of the bicycle (not shown in the figures). The rotation of the rotating body 10 in the forward or reverse rotational direction with respect to the fixed axle 8 winds or unwinds the inner cable 4a.

Figure 4:
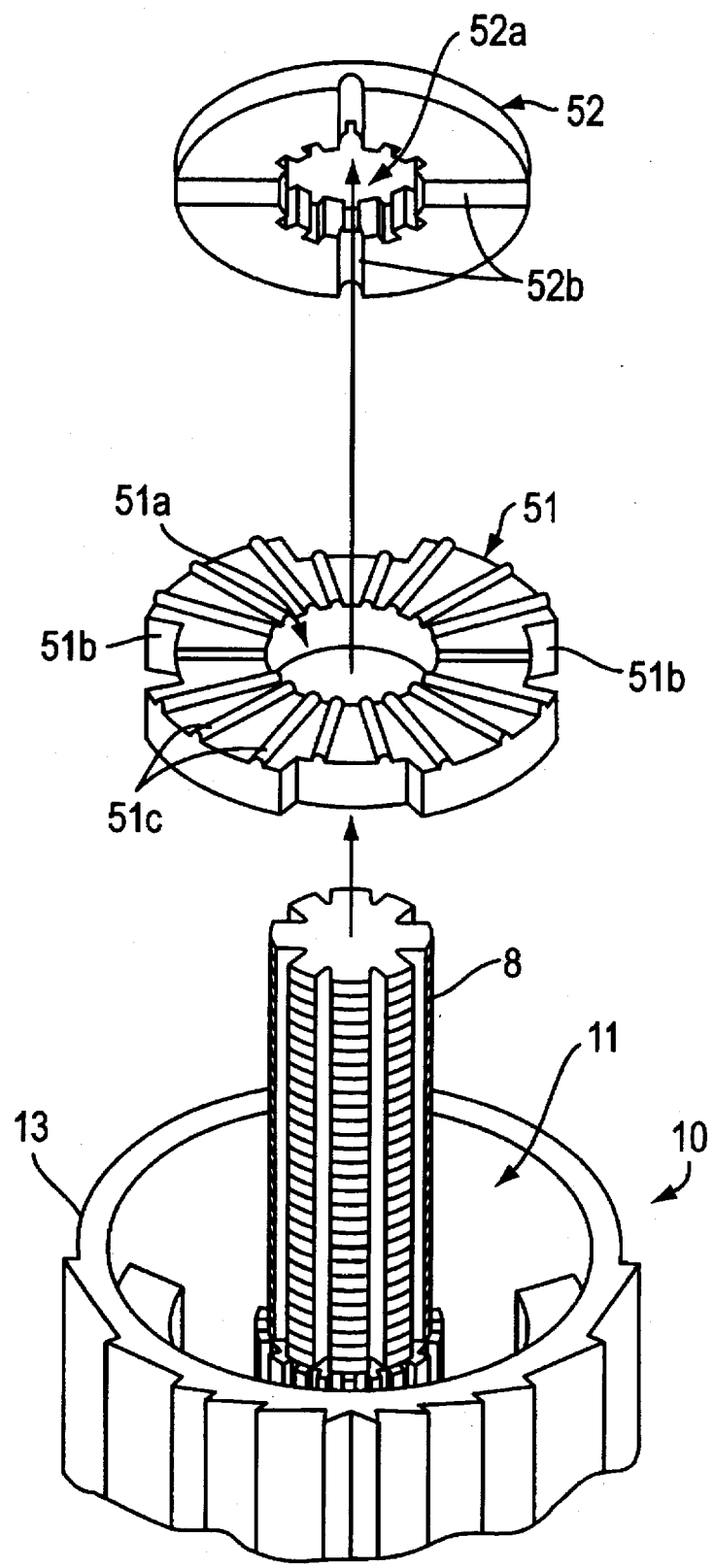
FIG. 4 is an exploded view of a particular embodiment of a position fixing mechanism according to the present invention.

The position fixing mechanism 50 comprises first and second position fixing plates 51 and 52 that are fit over the fixed axle 8 inside the rotating body 10, and a pair of disc springs 53 fitted over the fixed axle 8 between the first position fixing plate 51 and the bottom of the indentation 11. As shown in FIG. 4, a circular through hole 51a is provided to the center of the first position fixing plate 51, and spline protrusions 51b are provided to the outer periphery of said plate. The fixed axle 8 is inserted through this through hole 51a, at which time the aforementioned spline protrusions 51b engage the gaps among the plurality of radial protrusions provided to the inner periphery of a cylinder 13 that forms the indentation 11 of the rotating body 10, whereby the first position fixing plate 51 is allowed to swing around the fixed axle 8 and to rotate as one with the rotating body 10. The second position fixing plate 52 engages the fixed axle 8 through a spline hole 52a, and is fixed in the upper limit position by a spacer/fixture set 9b. The disc springs 53 energize the first position fixing plate 51 so that it slides in the direction of the second position fixing plate 52, creating a state in which the plurality of ridges 51c on the first position fixing plate 51 engage the plurality of grooves 52b on the position fixing plate 52.

When the position fixing mechanism 50 is engaged, the second position fixing plate 52 that is fixed to the fixed axle 8 stops the rotation of the rotating body 10 via the first position fixing plate 51. However, when the rotating body 10 is rotated with a control force greater than the specified force determined by the power of the disc springs 53, the first position fixing plate 51 slides against the disc springs 53 in the direction in which it will detach from the second position fixing plate 52, and the ridges 51c disengage from the grooves 52b on the second position fixing plate 52, allowing the rotating body 10 to rotate. In other words, the position fixing mechanism 50 attains a state of disengagement in which a control force greater than the aforementioned set force is applied, and the rotating body 10 rotates, and when the position fixing mechanism then reattains a state of engagement, the rotating body 10 becomes fixed at another shifting position.

The shifting operation of this shifting control unit 5 is described using FIGS. 2 and 3. In the case of single stage shifting, when the fingers of the hand holding onto the grip are placed on the knob 23 and the control body 20 is swung in the peripheral direction of the support axle 61, in other words in the arrow UP direction in the second direction, the gear 21 transmits this swing displacement as the rotational displacement of the rotating body 10 via the first gear transmission mechanism 30, i.e., via the drive gear 31 and the slave gear 32, and this places the position fixing mechanism 50 in a state of disengagement and allows the rotating body 10 to rotate in the winding direction from the shifting position it occupied prior to the shifting operation, and this in turn results in the inner cable 4a being wound. When the rotating body 10 reaches the specified shifting position, the swinging operation of the control body 20 is stopped. At this point, the rotating body 10 achieves the new shifting position that is the target of the shifting operation, the winding of the specified length of the inner cable 4a is complete, the position fixing mechanism 50 switches from a stage of disengagement to a stage of engagement, the rotating body 10 is held at the new shifting position, and the shifting operation to the adjacent up-shifting shifting position is thus complete. Down-shifting, by contrast, is performed by swinging the control body 20 in the arrow DOWN direction in the second direction, whereby the inner cable 4a is unwound by a specified length.

In the case of multistage shifting, the fingers of the hand holding onto the grip are placed on the knob 23, and the control body 20 is swung in the axial direction of the support axle 61, i.e., towards the arrow indicating multi stage shifting direction in the second direction, until the gear 21 disengages from the drive gear 31 of the first gear transmission mechanism 30 and engages the drive gear 41 of the second gear transmission mechanism 40. In this state, when the control body 20 is swung in the arrow UP direction in the first direction, the gear 21 transmits this swing displacement as the rotational displacement of the rotating body 10 via the second gear transmission mechanism 40, i.e., via the drive gear 41 and the slave gear 42, whereby the position fixing mechanism 50 is placed in a state of disengagement, thereby rotating the rotating body 10 from the shifting position it occupied prior to the shifting operation in the winding direction, and thus winding the inner cable 4a. At this time, as described above, because of the difference in the gear ratios of the first gear transmission mechanism 30 and the second gear transmission mechanism 40, the rotating body 10 is rotated twice as much as in the case of a single stage shifting operation, even though the control body 20 swing displacement is the same, and this makes it possible for the adjacent shifting position to be skipped, and for the inner cable 4a to be wound up to the next shifting position beyond the adjacent one. Once winding to the desired position has been completed, the rotating body 10 is held at the new shifting position by the action of the position fixing mechanism 50, as described above, allowing up-shifting to the desired shifting position to be realized. If the cyclist's grip on the knob 23 is released, the control body 20 will swing, due to the force of the springs, in the first direction towards the arrow single stage shifting, and the gear 21 will return to a position at which it engages the drive gear 31 of the first gear transmission mechanism 30. For down-shifting, after the control body 20 has been swung in the first direction towards the arrow indicating multistage shifting, the control body 20 should then be swung in the second direction towards the DOWN arrow.

Figure 5:
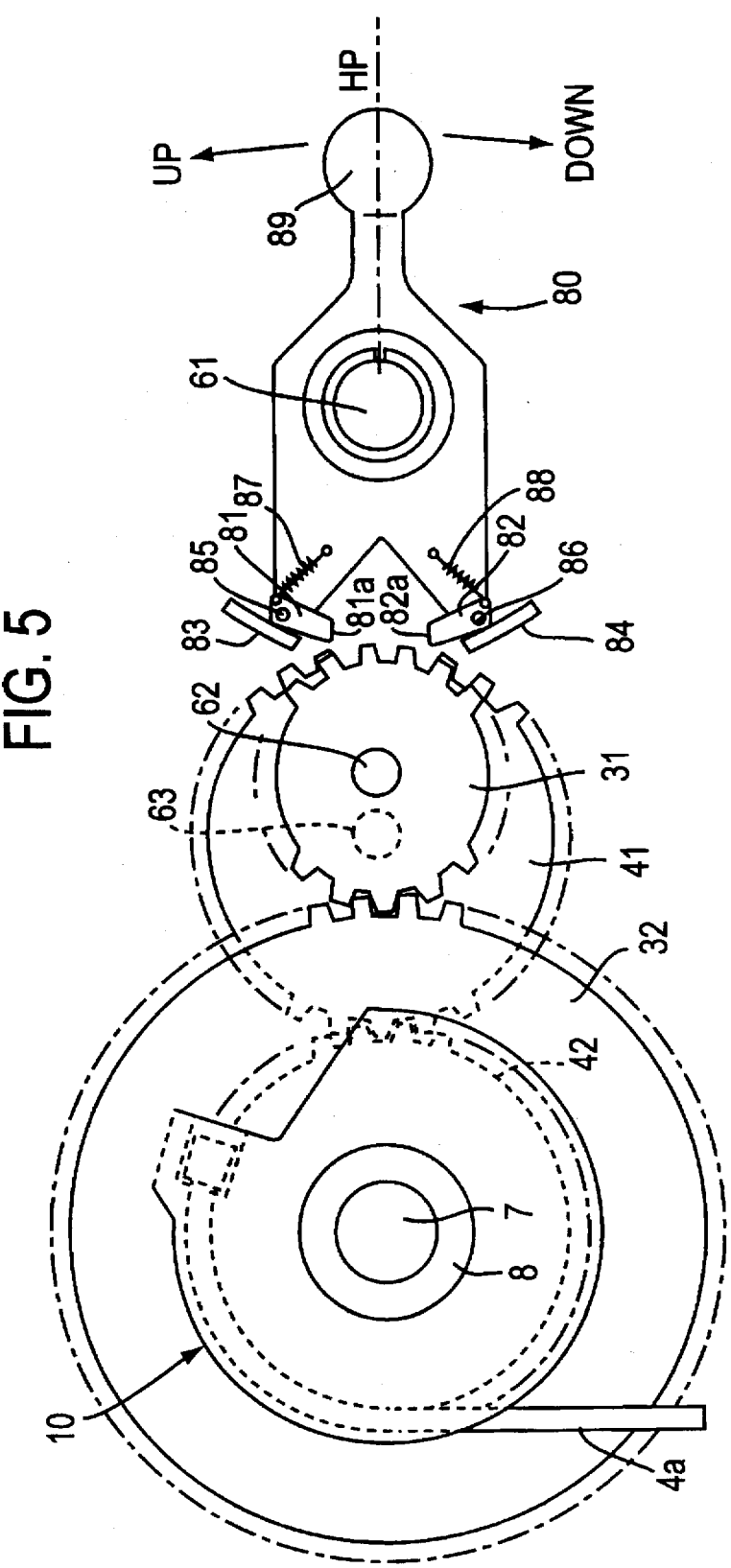
FIG. 5 is a cross-sectional diagram similar to FIG. 3 showing an alternative embodiment of a shifting control unit according to the present invention.

FIG. 5 shows another embodiment of the shifting control unit which pertains to the present invention. This embodiment differs from the previous embodiment in that the gear of the control body is replaced by two ratchet pawls. This control body 80 comprises a first ratchet pawl 81 and a second ratchet pawl 82 that are provided facing each other at the ends of the gear transmission mechanism. The first ratchet pawl 81 can be swung by the support pin 85, and the pawl tip 81a that is molded to the tip of this pawl is energized in the clockwise direction as seen in FIG. 5 by a spring 87 so that it can engage the drive gears 31 and 41 of the gear transmission mechanisms. Furthermore, the first ratchet pawl 81 is structured so that, when the control body 80 is positioned in the range of swinging in the direction of the DOWN arrow from its home position HP, the pawl tip 81a is raised by the cam member 83 so that it is detached from the drive gears 31 and 41 of the gear transmission mechanisms. Similarly, the second ratchet pawl 82 can be swung by a support pin 86, and a pawl tip 82a that is molded to the end of the pawl is energized in the counterclockwise direction as seen in FIG. 5 by a spring 88 so that it can engage the drive gears 31 and 41 of the gear transmission mechanisms. Furthermore, the second ratchet pawl 82 is structured so that, when the control body 80 is positioned in the range of swinging in the direction of the UP arrow from its home position HP, the pawl tip 82a is raised by the cam member 84 so that it is detached from the drive gears 31 and 41 of the gear transmission mechanisms. This control body 80 is energized to a neutral position by a spring, not shown in the figure, so that it always returns to its home position HP which is set in the middle of its swing range in the second direction, which is the peripheral direction of the support axle 61.

The shifting operation of this shifting control unit, and the linkage between the control body 80 and the drive gear of the gear transmission mechanism in particular, is described as follows. The fingers of the hand holding onto the grip are placed on the knob 23, and either single stage shifting or multistage shifting is selected by swinging the control body in the first direction, which is parallel to the support axle 61 of the swinging control body 80. In this example, single stage shifting shall be considered to have been selected. The swinging control body 80 then is swung from its home position HP in the direction of the UP arrow in the second direction, and the first ratchet pawl 81 that is held up by the cam member 83 detaches from the cam member 83 and swings in the clockwise direction. The pawl tip 81a of the first ratchet pawl 81 then engages the drive gear 31 of the first gear transmission mechanism 30, and the rotating body 10 rotates for unwinding the inner cable 4a. Since the linkage of the first gear transmission mechanism 30, the rotating body 10, and the position fixing mechanism 50 is the same as that of the previous embodiment, a repetition here of the description thereof would be redundant, and has thus been omitted.

When the up-shifting operation has been completed and the cyclist's fingers have been removed from the control body 80, the control body 80 returns to its home position HP because of its being energized to a neutral position by the spring. At this time, the control body 80 effectively swings back to its HP without applying any torque to the drive gear 31, due to the well-known configuration of the teeth of the drive gear 31 and the pawl tip 81a of the first ratchet pawl 81, and the pawl tip 81a is ultimately raised once again by the cam member 83 to the home position HP. In the course of the control body 80 swinging from its home position HP during an up-shifting operation, the pawl tip 82a of the second ratchet pawl 82 is raised up by the cam member 84, breaking the linkage with the drive gear of the gear transmission mechanism.

Similarly, when the swinging control body 80 is swung from its home position HP in the second direction in the direction of the DOWN arrow, the second ratchet pawl 82 that is raised up by the cam member 84 is detached from the cam member 84 and thus swings in the counterclockwise direction. The pawl tip 82a of second ratchet pawl 82 then engages the drive gear 31 of the first gear transmission mechanism 30, and the rotating body 10 rotates for winding the inner cable 4a. When the down-shifting operation has been completed and the control body 80 has returned to its home position HP due to the neutral energizing of the spring, the control body 80 swings back to its home position with effectively no torque being applied to the drive gear 31 thanks to the well-known configuration of the teeth of the drive gear 31 and the pawl tip 82a of the second ratchet pawl 82, and finally, the pawl tip 82a is once again raised up by the cam member 84 and returned to its home position HP. In the course of the control body 80 swinging from its home position HP during a down-shifting operation, the pawl tip 81a of the first ratchet pawl 81 is raised up by the cam member 83, breaking the linkage with the drive gear of the gear transmission mechanism.

Multistage shifting is performed by means of a similar process, although because of the difference between the first gear transmission mechanism 30 and the second gear transmission mechanism 40, an identical control body 80 swinging displacement angle results in a rotating body 10 rotational displacement angle that is 3 times as great, and this in turn results in a greater inner cable 4a operation amount.

While the above is a description of various embodiments of the present invention, further modifications may be employed without departing from the spirit and scope of the present invention. For example, the control member may be constructed for swinging, rotating, or sliding. The transmissions may be friction types, cam types, or gear types. Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A bicycle shifting control unit comprising:
   a rotating body (10) for rotating in one direction to wind a shifting cable and for rotating in another direction to unwind the shifting cable;
   a control member (20,80) operable by a user;
   a first transmission (30) for transmitting movement of the control member (20,80) into rotation of the rotating body (10) at a first transmission ratio;
   a second transmission (40) for transmitting movement of the control member (20,80) into rotation of the rotating body (10) at a second transmission ratio;
   a coupling mechanism (22,22a,61) for allowing the control member (20,80) to be selectively coupled to the first transmission (30) and to the second transmission (40);
   wherein the second transmission ratio is greater than the first transmission ratio.

2. The control unit according to claim 1 wherein the control member (20,80) moves along a selection path for selectively coupling the control member to the first transmission (30) and to the second transmission (40), wherein the control member moves along a drive path for transmitting movement of the control member (20,80) into rotation of the rotating body (10), and wherein the selection path is different from the drive path.

3. The control unit according to claim 1 wherein the rotating body (10) is rotatably supported on a fixed axle (8), and further comprising a position determining mechanism (50) for maintaining the rotating body (10) at positions with respect to the fixed axle (4) that correspond to various shifting positions of the control unit.

4. The control unit according to claim 1 wherein the coupling mechanism (22,22a,61) comprises a ball joint (22a).

5. The control unit according to claim 1 wherein the first transmission (30) comprises a first transmission gear (31), and wherein the second transmission (40) comprises a second transmission gear (41).

6. The control unit according to claim 5 further comprising a control gear (21) disposed on an end of the control member (20) for selectively meshing with the first transmission gear (31) and the second transmission gear (41).

7. The control unit according to claim 6 wherein the control member (20,80) moves along a selection path for selectively coupling the control member to the first transmission (30) and to the second transmission (40), wherein the control member moves along a drive path for transmitting movement of the control member (20,80) into rotation of the rotating body (10), and wherein the selection path is different from the drive path.

8. The control unit according to claim 7 wherein the coupling mechanism (22,22a,61) comprises a ball joint (22a).

9. The control unit according to claim 5 further comprising:
   a first slave gear (32) coupled to the rotating body for meshing with the first transmission gear (31); and
   a second slave gear (42) coupled to the rotating body (10) for meshing with the second transmission gear (41).

10. The control unit according to claim 9 wherein the first slave gear (32) is integrally formed with the rotating body (10), and wherein the second slave gear (42) is integrally formed with the rotating body (10).

11. The control unit according to claim 10 further comprising a control gear (21) disposed on an end of the control member (20) for selectively meshing with the first transmission gear (31) and the second transmission gear (41).

12. The control unit according to claim 11 wherein a diameter of the first slave gear (32) is greater than a diameter of the second slave gear (42).

13. The control unit according to claim 12 wherein the control member (20,80) moves along a selection path for selectively coupling the control member to the first transmission (30) and to the second transmission (40), wherein the control member moves along a drive path for transmitting movement of the control member (20,80) into rotation of the rotating body (10), and wherein the selection path is different from the drive path.

14. The control unit according to claim 13 wherein the coupling mechanism (22,22a,61) comprises a ball joint (22a).

15. The control unit according to claim 5 further comprising:
   a first pawl (81) disposed on an end of the control member (80) for selectively transmitting motion to the first transmission (30) and to the second transmission (40) when the control member is moved in a first direction along a drive path; and
   a second pawl (82) disposed on an end of the control member (80) for selectively transmitting motion to the first transmission (30) and to the second transmission (40) when the control member is moved in a second direction along the drive path.

16. The control unit according to claim 15 further comprising:
   a first cam (83) for retaining the first pawl (81) out of contact with the first transmission (30) and the second transmission (40) when the control member (80) moves in the second direction; and
   a second cam (84) for retaining the second pawl (82) out of contact with the first transmission (30) and the second transmission (40) when the control member (80) moves in the first direction.

17. The control unit according to claim 16 wherein the first pawl (81) and the second pawl (82) are retained out of contact with the first transmission (30) and the second transmission (40) when the control member (80) is disposed at an intermediate location along the drive path.

18. The control unit according to claim 17 wherein the control member (20,80) moves along a selection path for selectively coupling the control member to the first transmission (30) and to the second transmission (40).

19. The control unit according to claim 18 wherein the coupling mechanism (22,22a,61) comprises a ball joint (22a).

20. The control unit according to claim 19 wherein the first direction is opposite the second direction.

* * * * *